United States Patent
Emanuel

(10) Patent No.: US 7,154,931 B2
(45) Date of Patent: Dec. 26, 2006

(54) LASER WITH BRAYTON CYCLE OUTLET PUMP

(75) Inventor: George Emanuel, Arlington, TX (US)

(73) Assignee: KSY Corporation, Arlington, TX (US)

( * ) Notice: Subject to any disclaimer, the term of this patent is extended or adjusted under 35 U.S.C. 154(b) by 239 days.

(21) Appl. No.: 10/874,039

(22) Filed: Jun. 22, 2004

(65) Prior Publication Data

US 2005/0281307 A1 Dec. 22, 2005

(51) Int. Cl.
*H01S 3/095* (2006.01)
*H01S 3/22* (2006.01)
*H01S 3/223* (2006.01)

(52) U.S. Cl. .......................... 372/89; 372/55

(58) Field of Classification Search .............. 372/89, 372/55, 58, 60
See application file for complete search history.

(56) References Cited

U.S. PATENT DOCUMENTS

| | | | | |
|---|---|---|---|---|
| 2,678,531 A | * | 5/1954 | Miller | 60/775 |
| 3,656,872 A | * | 4/1972 | Jubb | 417/364 |
| 3,665,336 A | * | 5/1972 | McLafferty | 372/90 |
| 3,668,549 A | * | 6/1972 | Biancardi et al. | 372/34 |
| 3,832,650 A | * | 8/1974 | Roberts | 372/89 |
| 3,998,393 A | | 12/1976 | Petty | |
| 4,058,141 A | | 11/1977 | Hasinger et al. | |
| 4,166,361 A | | 9/1979 | Earnest et al. | |
| 4,207,542 A | | 6/1980 | Shen | |
| 4,235,372 A | | 11/1980 | Salter | |
| 4,348,766 A | * | 9/1982 | Born | 372/89 |
| 4,403,325 A | * | 9/1983 | Born et al. | 372/90 |
| 4,435,810 A | | 3/1984 | Hasinger et al. | |
| 4,457,000 A | | 6/1984 | Rao | |
| 4,487,366 A | | 12/1984 | Davis et al. | |
| 4,938,112 A | | 7/1990 | Hertzberg et al. | |
| 5,384,802 A | * | 1/1995 | Bushman | 372/89 |
| 5,632,142 A | * | 5/1997 | Surette | 60/772 |
| 5,735,469 A | | 4/1998 | Rodriguez et al. | |
| 5,779,196 A | | 7/1998 | Timar | |
| 5,974,072 A | * | 10/1999 | Hartlove et al. | 372/89 |
| 6,003,789 A | | 12/1999 | Base et al. | |

(Continued)

OTHER PUBLICATIONS

Theordore Baumeister, "Brayton Cycle," in AccessScience@McGraw-Hill, http://www.accessscience.com, DOI 10.1036/1097-8542.093900, last modified: Apr. 6, 2001.*

(Continued)

*Primary Examiner*—Minsun Oh Harvey
*Assistant Examiner*—Hrayr A. Sayadian
(74) *Attorney, Agent, or Firm*—Storm LLP; Mark D. Perdue; John J. Patti

(57) ABSTRACT

A chemical oxygen-iodine laser (COIL) comprises an oxygen generator and a nozzle for accelerating generated oxygen to a high or supersonic velocity. A laser cavity is coupled to the nozzle, wherein the accelerated fluid, with injected iodine, is employed as a laser gain medium. A Brayton cycle outlet pump employs the accelerated oxygen and iodine as a component of a process fluid in a Brayton cycle to raise the static pressure of the accelerated fluid to ambient conditions. The Brayton cycle pump comprises a compressor having an inlet and an outlet, the inlet being coupled to the laser cavity to receive and compress accelerated oxygen. A combustor is coupled to the outlet of the compressor to receive compressed oxygen and ignite and combust it A turbine is coupled to the outlet of the combustor to expand the ignited and combusted gas, wherein the turbine powers the compressor. Multiple reheat stages may be used and regeneration and intercooling may also be used. The use of reheat, regeneration, and intercooling depends on the application.

23 Claims, 2 Drawing Sheets

U.S. PATENT DOCUMENTS

| | | | |
|---|---|---|---|
| 6,072,820 A * | 6/2000 | Dickerson | 372/51 |
| 6,099,805 A * | 8/2000 | Hartlove | 422/122 |
| 6,133,577 A | 10/2000 | Gutowski et al. | |
| 6,155,040 A * | 12/2000 | Sasaki | 60/806 |
| 6,194,733 B1 | 2/2001 | Haas et al. | |
| 6,282,894 B1 | 9/2001 | Smith | |
| 6,302,142 B1 * | 10/2001 | Behrens | 137/338 |
| 6,910,335 B1 * | 6/2005 | Viteri et al. | 60/786 |
| 2002/0014069 A1 * | 2/2002 | Holtzapple et al. | 60/39.63 |
| 2003/0046938 A1 * | 3/2003 | Mortzheim et al. | 60/782 |
| 2005/0252211 A1 * | 11/2005 | Schmid et al. | 60/602 |

OTHER PUBLICATIONS

Practical Implementation of a Co2-laser-coupled quantum heat engine, by Alan Hill et al., Phys. Rev. A, 72, 043802 (2005).*

Performance projections for functional Co2 laser coupled quantum heat engines, by Alan Hill et al., Journal of Modern Optics, Nov. 10-Dec. 15, 2004, vol. 51, No. 16-18, 2713-2725 (2004).*

Johannesen, N.H., "Experiments on Two-dimensional Supersonic Flow in Corners and over Concave Surfaces," Phil. Mag., vol. 43, Ch. LII, pp. 568-580 (1952).

Lukasiewicz, J., "Diffusers for Supersonic Wind Tunnels," Journal of the Aeronautical Sciences, vol. 20, No. 9, pp. 617-626 (Sep. 1953).

Sears, W.R., "Conflicts Between Theory and Experiment," General Theory of High Speed Aerodynamics, vol. VI (High Speed Aerodynamics and Jet Propulsion), pp. 561-565 (1954).

Roschke, E.J. et al., "Experimental Investigation of Exhaust Diffusers for Rocket Engines," Technical Report No. 32-210, p. 93, NASA, Propulsion Lab., C.I.T. (Mar. 1962).

Svehla, Roger, "Estimated Viscosities and Thermal Conductivities of Gases at High Temperatures," Technical Report R-132, NASA, p. 98 (1962).

NAVWEPS Report 1488, "Ducts, Nozzles and Diffusers," Handbook of Supersonic Aerodynamics, vol. 6, Sec. 17, pp. 269-278, 288-294, Johns Hopkins Univ., Maryland (Jan. 1964).

Warren, W.R., Jr., "Reacting flow and pressure recovery processes in HF/DF chemical lasers," Acta Astronautica, vol. 1, pp. 813-834, Pergamon Press (1974).

Durran, D.A. et al., "Pressure Recovery in a Constant-Area Diffuser for Chemical Lasers With Nozzle Base Relief," Report SAMSO-TR-75-147, Aerospace Corp., Calif. (Jun. 1975).

Emanuel, George, "Optimum Performance for a Single-Stage Gaseous Ejector," AIAA Journal, vol. 14, No. 9, pp. 1292-1296 (Sep. 1976).

Driscoll, R.J. et al., "Pressure Recovery in Chemical Lasers," AIAA Journal, vol. 15, No. 5, pp. 665-673 (May 1977).

Hanus, G.J. et al., "Leading-Edge Injection for Film Cooling of Turbine Vanes," J. Energy, vol. 1, No. 1, pp. 44-45 (1977).

Vershure, R.W. et al., "Demonstration of a Cooled Laminated Integral Axial Turbine," J. Aircraft, vol. 15, No. 11, p. 735 (Nov. 1978).

Smith, R. et al., "Advanced General Aviation Turbine Engine (Gate) Study," Final Report, NASA CR-159624, Teledyne CAE 1600, pp. 1-2, 21, 23, 26-27, 54, 115 (Jun. 1979).

Durran, D.A. et al., "Stability of a Normal Shock in Radial Reacting Flow with Nonuniformities," Report SD-TR-81-51, Aerospace Corp., Calif. (Jun. 1981).

Emanuel, G., "Comparison of One-Dimensioal Solutions with Fabri Theory for Ejectors," Acta Mechanica, vol. 44, pp. 187-200 (1982).

Emanuel, George, "Near-field analysis of a compressive supersonic ramp," Phys. Fluids, vol. 25, No. 7, pp. 1127-1133 (Jul. 1982).

Emanuel, George, "Numerical Method and Results for Inviscid Supersonic Flow Over a Compressive Ramp," Computers & Fluids, vol. 11, No. 4, pp. 367-377 (1983).

Emanuel, George, Gasdynamics: Theory and Applications, AIAA Education Series, pp. 101-107, 311-312 (1986).

Smits, A.J. et al., "Experimental study of three shock wave/turbulent boundary layer interactions," J. Fluid Mech., vol. 182, pp. 291-314 (1987).

Shirazi, S. A. et al., "Simple Turbulence Models for Supersonic Flows: Bodies at Incidence and Compression Corners," AIAA Journal, vol. 29, No. 11, pp. 1850-1859 (Nov. 1991).

Lee, J. et al., "Study of Turbulence on Supersonic Compression Surfaces Using Reynolds Stress Model," AIAA Journal, vol. 30, No. 7, pp. 1738-1746 (Jul. 1992).

Moran, M. J. et al., Fundamentals of Engineering Thermodynamics, Second Ed., pp. 374-398, John Wiley & Sons, Inc. (1992).

A'Rafat, Sa'Ed, "Numerical Analysis of the Viscous Flow in a Supersonic Diffuser," a thesis for graduate program at Embry-Riddle Aeronautical Univ., Fla. (unpublished).

McBride, B.J. et al., "Computer Program for Calculation of Complex Chemical Equilibrium Compositions and Applications," NASA Ref. Publ. 1311, pp. 25, 73-74 (1996).

Cengel, Y.A. et al., Thermodynamics, An Engineering Approach, 3rd Ed., pp. 508-523, McGraw-Hill (1998).

Han, Je-Chin et al., Gas Turbine Heat Transfer and Cooling Technology, Chapter 1, pp. 1-25, Taylor & Francis (2000).

Roclawski, H. et al., "Experimental and Computational Investigation of Flow in Gas Turbine Blade Cooling Passages," AIAA Paper 2001-2925, pp. 1-30 (Jun. 2001).

Lohn, P.D. et al., "COIL Laser Diffuser Design," AIAA Paper 2001-3010, pp. 1-9 (Jun. 2001).

Emanuel, George, Analytical Fluid Dynamics, 2nd Ed., pp. 589-592, CRC Press (2001).

Padture, N.P. et al., "Thermal Barrier Coatings for Gas-Turbine Engine Applications," Science's Compass, vol. 296, pp. 280-284 (Apr. 2002).

Emanuel, George et al., UTA-MAE Research Report 2002-01 on Steady, Oblique, Detonation Waves, pp. 42-50 (Dec. 2002).

Ligrani, P.M. et al., "Comparison of Heat Transfer Augmentation Techniques," AIAA Journal, vol. 41, No. 3, pp. 337-338 (Mar. 2003).

Emanuel, George et al., "Lense Analogy for Diffusers and Nozzles," AME Report 98-1, The School of Aerospace and Mechanical Engineering, OU (unpublished).

* cited by examiner

LASER WITH BRAYTON CYCLE OUTLET PUMP

TECHNICAL FIELD

This application relates to a method and apparatus for increasing the pressure of a gas exiting a chemical oxygen-iodine laser.

BACKGROUND

The chemical oxygen-iodine laser (COIL) is undergoing development as the high-performance laser of choice for target interdiction. In this laser, a supersonic flow of singlet delta oxygen is used with iodine as the gain medium in the laser cavity of a continuous wave (cw) chemical laser. A chemical gas laser according to the invention involves a steady, supersonic, low-pressure gaseous flow inside the laser cavity. In fact, all high-performance cw chemical lasers operate supersonically with a laser cavity pressure of a few Torr. For example, a COIL typically operates in the 1 to 10 Torr range, although pressures as high as 20 Torr may be possible. A pressure value above about 4 Torr is usually achieved by adding diluent gas to the singlet oxygen generator (SOG) that drives the COIL device. A diffuser is then used to increase the device's exit pressure. If this pressure is still below ambient, the diffuser is followed by a pumping system that typically consists of mechanical pumps or an ejector system. (In specialized cases, chemical pumping may be used.) The type of high-performance laser under consideration may potentially be mounted on a motorized vehicle, naval vessel, or on an aircraft. It requires a pressure recovery system to move the high-speed, spent laser gas from its several Torr value to a pressure level slightly above ambient. At sea level, ambient is 760 Torr, while ambient for an aircraft at a 40,000 foot altitude would be close to 150 Torr. Thus, due to the pressure differential, pressure recovery presents a challenge. In any case, the size and weight of the pressure recovery system is significant to the viability of the overall laser system. It is thus important that the pressure recovery system be as compact and lightweight as possible for the intended application.

In a laboratory, mechanical pumps are used for pressure enhancement, but these are certainly not compact or lightweight. Outside of the laboratory, ejectors are typically utilized. The ejector system, however, may require multiple stages and is both bulky and heavy. In special cases, where the laser run time and power are limited, a bulky chemical pump system can be used.

Accordingly, there is a need for a relatively compact or lightweight pressure recovery system for increasing the pressure of a gas used in a chemical oxygen-iodine laser so that the gas may be brought to ambient pressure.

SUMMARY

It is a general object of the present invention to provide a chemical gas laser with a means for raising the high-velocity, low-pressure lasing or gain medium to ambient conditions. This and other objects of the present invention are achieved by providing a chemical oxygen-iodine laser (COIL) that comprises an oxygen generator and a nozzle for accelerating generated oxygen to a high or supersonic velocity. A laser cavity is coupled to the nozzle, wherein the accelerated oxygen, with injected iodine, is employed as a laser gain medium. A Brayton cycle outlet pump employs the accelerated oxygen and iodine as a component of a process fluid in a Brayton cycle to raise the static pressure of the accelerated oxygen and iodine to ambient conditions.

According to the preferred embodiment of the present invention, the Brayton cycle pump comprises a compressor having an inlet and an outlet, the inlet being coupled to the laser cavity to receive and compress accelerated oxygen. A combustor is coupled to the outlet of the compressor to receive compressed oxygen and ignite and combust it. A turbine is coupled to the outlet of the combustor to expand the ignited and combusted gas, wherein the turbine powers the compressor.

According to the preferred embodiment of the present invention, a diffuser between the laser cavity and the Brayton cycle outlet pump is used to decelerate the flow of oxygen and iodine from supersonic velocity.

According to the preferred embodiment of the present invention the Brayton cycle outlet pump comprises multiple stages of compressors, combustors, and turbines.

According to the preferred embodiment of the present invention the Brayton cycle outlet pump includes a reheat stage.

According to the preferred embodiment of the present invention, the Brayton cycle outlet pump includes a regeneration stage.

According to the preferred embodiment of the present invention, the turbine has a work output that exceeds the work required to operate the compressor, wherein there is net work output from the Brayton cycle pump.

Other objects, features, and advantages of the present invention will become apparent with reference to the drawings and the detailed description, which follow.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
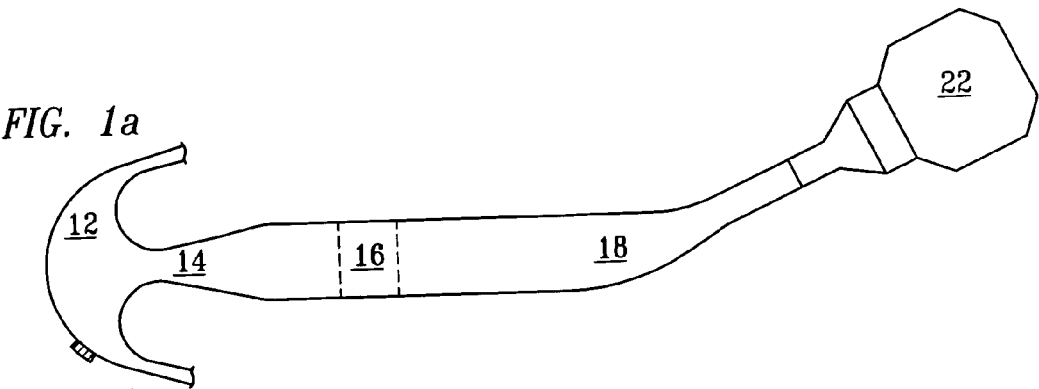
FIG. 1a is a schematic diagram of a chemical laser system including a diffuser and a Brayton cycle pump.
Figure 1B:
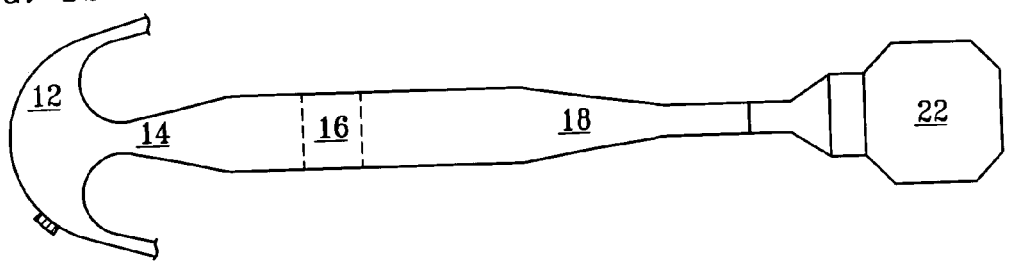
FIG. 1b is a schematic diagram of an alternative embodiment of a chemical laser system including a diffuser and a Brayton cycle pump.

Shown in FIG. 1 is a chemical oxygen iodine laser (COIL) system. A singlet oxygen generator ("SOG") 12 generates singlet delta oxygen for the laser. The SOG is preferably constructed according to U.S. patent application Ser. No. 10/453,148, although other SOG's are known and may be used. The singlet delta oxygen, which may contain a diluent and other constituents (collectively "gas"), flows from the SOG through the laser nozzle 14. The gas typically comprises oxygen, water vapor, iodine, helium, chlorine and possibly SOG diluent. The gas flows through an optical or laser cavity 16 at supersonic velocity and at a pressure typically between 1 and 10 Torr, although pressures as high as 20 Torr may be possible.

After passing through the laser or optical cavity 16, the gas continues, preferably, to a diffuser 18 followed by a Brayton cycle outlet pump ("BCP") 22 according to the present invention. A BCP is a Brayton cycle engine configured to use the gas exiting the optical chamber and diffuser 18 as the oxygen source for the engine. If flow through the laser or optical cavity is supersonic, a diffuser must be used to decelerate the fluid prior to entry into the BCP to avoid a shock system in or upstream of the optical cavity. The BCP is configured as a pump so that the BCP exhaust will be at a higher pressure than the pressure of the gas entering the BCP. The diffuser 18 and BCP 22 each act to raise the pressure of the gas so that, upon exiting the BCP 22, the stagnation pressure of the gas will be greater than the ambient pressure and the gas may be vented to the atmosphere, a storage unit (not shown) or additional processing equipment (not shown). The diffuser 18 is preferably designed as described in a copending application entitled Supersonic Diffuser, Ser. No. 10/874,040, filed concurrently herewith.

Figure 2:
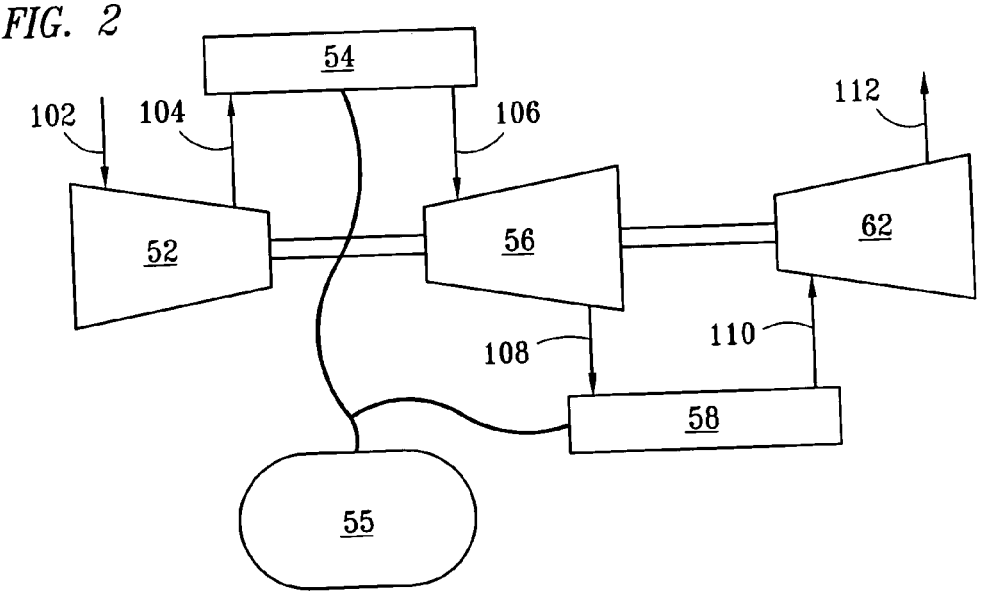
FIG. 2 is a schematic diagram of a Brayton cycle pump that may be used with a chemical oxygen iodine laser.

FIG. 2 is a schematic of a BCP that is used to further enhance the pressure of gas exiting the diffuser 18. The gas enters a compressor 52, which compresses or raises the pressure of the gas. The compressor 52 may be an axial, radial or reciprocating compressor or any other compressor suitable for raising the pressure of the effluent. The compressor 52 may include only a single compression stage or several compression stages. Preferably, the compressor 52 is a single-stage compressor with axial inflow and radial outflow. The gas entering the compressor 52 may be at the operating pressure of the laser if the laser flow is subsonic. In the case of supersonic flow in the laser cavity, the pressure of the gas is increased by the diffuser, the magnitude of the increase depending on the Mach number of the fluid entering the diffuser and the efficiency of the diffuser.

After the gas is compressed, it is passed to a first combustor 54. In the first combustor 54, fuel from a fuel source 55 is mixed with the gas and ignited. The fuel is preferably a hydrocarbon fuel, although other fuels are known and may be used. If the COIL is installed in an aircraft or other vehicle, the vehicle fuel may also be used to fuel the BCP. The fuel source 55 may be a dedicated fuel tank, a vehicle fuel tank for COIL installed in an aircraft or other vehicle, or another fuel source.

Upon exiting the combustor 54, the hot gas passes to a first turbine 56, which converts the elevated enthalpy of the gas into mechanical work through expansion. The first turbine 56 may be an axial or radial turbine or any other turbine suitable for efficiently converting the elevated enthalpy of the effluent into mechanical work. The first turbine 56 may include only a single expansion stage or several expansion stages. Preferably, the first turbine 56 is a single stage turbine with radial inflow and axial outflow.

In order to provide additional power, a reheat stage may be used, if needed, after the first turbine 56. If reheat is used, the gas passes from the first turbine 56 to a second combustor 58. In the second combustor 58, fuel is again added to the gas and ignited, raising the enthalpy of the gas. The fuel is preferably the same fuel used in the first combustor 54, although other fuels may be used.

The gas passes from the second combustor 58 (reheat stage) to a second turbine 62. The second turbine 62 may be an axial or radial turbine or any other turbine suitable for efficiently converting the elevated enthalpy of the effluent into mechanical work. The second turbine 62 may include only a single expansion stage or several expansion stages. In some cases, particularly where the COIL is being used at an elevated altitude or with a diffuser of the type described in my copending application Supersonic Diffuser, Ser. No. 10/874.040, filed concurrently herewith, the reheat stage (second combustor 58 and the second turbine 62) may not be necessary.

Figure 3A:
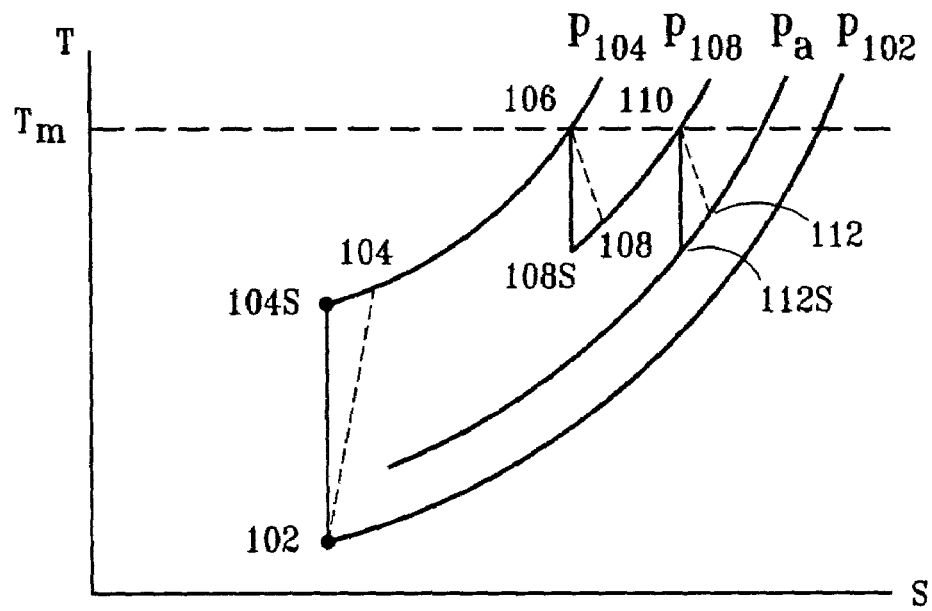
FIG. 3a is a temperature-entropy diagram for the Brayton cycle of FIG. 2.
Figure 3B:
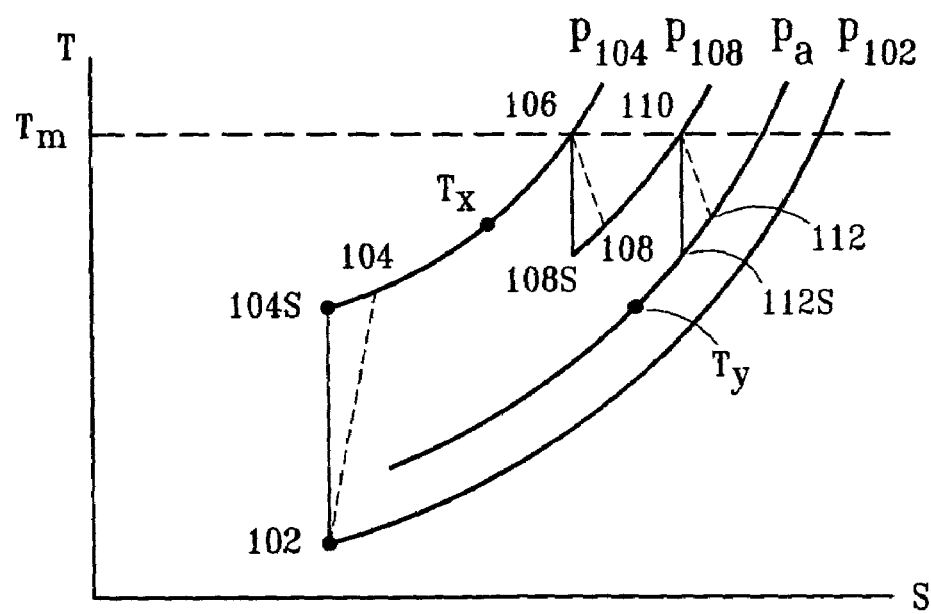
FIG. 3b is a temperature-entropy diagram for the Brayton cycle of FIG. 2 with regeneration.

FIG. 3a is a temperature-entropy (T-s) diagram corresponding to the BCP of FIG. 2. FIG. 3b is the same as FIG. 3a, except for the provision of a regenerator. As indicated, the FIG. 2 BCP has two combustors, two turbines, and no regeneration.

A control system (not shown) regulates the fuel flow rate in coordination with the operation of the laser so that the pressure of the effluent at the exit of the second turbine 62 (or the first turbine 56 if a second turbine is not used) is slightly higher than the ambient pressure, allowing the gas to be vented. In addition, the fuel flow rate is regulated so that the maximum turbine inlet temperature does not exceed $T_m$.

The following is a detailed example of an embodiment of certain aspects of the present invention. As indicated, the FIG. 2 BCP has two combustors, two turbines, and no regeneration. The reference numerals 102–112 refer to the gas conditions at each point in the BCP, e.g., $T_{102}$ is the gas temperature at the entrance to the compressor 52 and $p_{112}$ is the gas pressure at the exit of the second turbine 62.

A Brayton cycle can be operated with reheat, regeneration, and intercooling. With reheat, more than one combustor/turbine pair is used. Let n represent the number of combustor/turbine pairs, i.e., the number, minus one, of reheat stages. In the BCP model developed for the subsequent analysis, n can range from unity to five. FIG. 2 shows a single reheat stage; hence, n=2. The primary function of reheat is to increase the magnitude of turbine output power. Without reheat, the turbine power may be insufficient for driving the compressor 52.

Regeneration utilizes the hot gas from the exit of the last turbine stage, state 112 in FIG. 2, to heat the gas exiting the compressor 52 at state 104. A regenerator is usually a counterflow heat exchanger. The principal function of a regenerator is to reduce the fuel flow rate. This is evident by comparing FIG. 3a with FIG. 3b. The first combustor 54, see FIG. 3a, requires enough fuel to increase the temperature from $T_{104}$ to $T_{106}$, where $T_{106}$ equals the maximum cycle temperature, $T_m$. In FIG. 3b, less fuel is now required to increase the temperature from $T_x$ to $T_{106}$. Regeneration thus reduces the fuel flow rate to the first combustor 54, which otherwise requires much more fuel than the second (reheat) combustor 58. Regeneration is particularly effective in reducing the fuel flow rate when n is one or two and $T_{104}$ is well below $T_{106}$. As the compressor pressure ratio increases $T_{106}-T_{104}$ decreases and regeneration becomes less effective.

When a BCP is used as an auxiliary power unit ("APU," wherein the work output of the turbines exceed the work required to operate the compressor, thereby generating net work or power output), regeneration typically has a major impact on the cycle efficiency by reducing the heat input. (The power output also decreases slightly.) Cycle conditions in the subsequent analysis may appear to favor the use of regeneration. On the surface, the system trade-off associated with regeneration is the size and weight of the heat exchanger and ducting versus the reduction in fuel. A more relevant system comparison, as will be shown, is between the fuel flow rate, with or without regeneration, versus the basic hydrogen peroxide COIL flow rate.

In power engineering, the term "stage" sometimes has two distinct meanings. For instance, a single axial flow turbine may be said to have 10 stator/rotor stages. As used herein, the term stage refers to a single component, regardless of the number of stators or rotors. For example, if n=3, the BCP has three turbine stages. Similarly, if the compression ratio across the compressor is 49, the compression may be provided by two (centrifugal) in-line compressors, each with a compression ratio of 7, for example.

The approach here differs from standard Brayton cycle practice in that the BCP is primarily used as a pump, the inlet and exit pressures generally differ, and a complete combustion assumption is used for the oxygen/methane combustion rather than the simpler, less accurate, and inappropriate air-standard or cold air-standard approaches. The complete combustion assumption is needed if fuel and oxygen consumption rates are to be evaluated.

Metallurgical constraints set a limit on the turbine inlet temperature. This temperature is denoted as $T_m$ and is the maximum cycle temperature and the inlet temperature to each turbine stage in the BCP. The value of $T_m$ depends on the material the turbine is constructed with, its surface coating, whether blade cooling is used, the design of such cooling, and the like.

The BCP is preferably constructed according to the principles of the NASA-funded design study entitled, "Advanced General Aviation Turbine Engine (GATE) Study" The GATE study resulted in a recommendation that blade cooling not be used and that 1504 K represents a maximum turbine inlet temperature for uncooled blades. Therefore, uncooled blades are used in the BCP analysis according to the present invention with a maximum turbine inlet temperature of 1500 K. A typical GATE turbine stage has a radial inflow and an axial outflow with a maximum pressure ratio of 12. In the pump application, where the turbine pressure ratio is significantly smaller than the compressor ratio, and with reheat, the maximum turbine pressure ratio of 12 easily satisfies the cases discussed here.

For compressors, GATE examined a variety of configurations, centered about the use of a radial outflow centrifugal component. A single radial outflow component can have a pressure ratio as large as 9, as compared to a purely axial unit where the maximum pressure ratio is significantly less. GATE examined the performance of a radial, axial-radial, triple axial-radial, and twin radial compressors. They suggest that by 1985, an axial-radial unit can have a maximum pressure ratio of about 14.8 with an efficiency of 85%. For a somewhat higher pressure ratio, several axial units, upstream of the centrifugal unit, would be used. Starting at a pressure ratio above about 20, two, in-line, centrifugal units would be required. Because of the high inlet temperature to the second compressor, intercooling is recommended, in order to significantly decrease the inlet volumetric flow rate. This decreases the diameter of the compressor and improves its performance.

Detailed analysis shows that using the gaseous inlet flow, which is near 300 K at state 102, for intercooling is counter-productive. There is, however, a substantial, ready source of near-room-temperature liquid coolant. This is the dilute, spent BHP from the SOG. For reasons of simplicity, the cycle analysis does not consider intercooling.

Regardless of the number, or type, of compressor stages, the overall compression ratio is $$P_c = \frac{p_{104}}{p_{102}} \quad (1a)$$

or $$P_c = \frac{p_x}{p_{102}} \quad (1b)$$

when a regenerator is present. The $P_c$ values associated with aircraft and satellite-based operation are quite modest and a single compressor stage suffices. The $P_c$ value for sea-level operation is larger, and the compressor 52 may require one, or more, axial units, or a second centrifugal unit.

The assumptions for the following example cases are briefly summarized: A steady flow of a mixture of ideal gases is used with a modified Brayton cycle. The cycle may have regeneration and reheat, but no intercooling or internal turbine blade cooling. Each of the physical units, such as a combustor 54, 58 or a turbine 56, 62, is assumed to be adiabatic. The compressor 52, turbines 56, 62, and regenerator, however, have assigned efficiencies. When more than one turbine stage is present, the pressure ratio across each stage is the same. This maximizes the turbine output power.

For analytical convenience, methane is the fuel; it is viewed as a surrogate for hydrogen or any typical hydrocarbon fuel. Although COIL may, or may not, have an inert diluent, no diluent is explicitly considered, i.e., at the BCP inlet the gas is pure oxygen. This is not a significant factor, since, typically, less than 15% of the oxygen is burned; the remainder, in effect, is diluent. Complete combustion is assumed. In the model, this means that only $O_2$, $H_2O$, and $CO_2$ exit a combustor. A turbine inlet temperature of 1500 K is specified for each turbine stage.

In practice, other fluids (liquid or gas) enter compressor 102. Relative to the oxygen, they have small molar flow rates. These fluids include water vapor, iodine, helium, and possibly a trace amount of chlorine. These constituents have, at most, a minor effect on the performance of a BCP. With a COIL plus diffuser based on my copending application Ser. Nos. 10/453,148, 10/658,569 and the Supersonic Diffuser disclosure, the need for SOG diluent is unlikely, even for sea-level operation. As noted earlier, a BCP can still be used even when there is a significant SOG molar flow rate of diluent, for any desired diluent.

The subscript j, j=1, 2, 3, 4, denotes the species, as given below in table 1, where $W_j$ is the molecular weight of species j.

TABLE 1

| j | species | $W_j$ (kg/kmol) |
|---|---------|-----------------|
| 1 | $O_2$   | 31.9988         |
| 2 | $CH_4$  | 16.04246        |
| 3 | $H_2O$  | 18.01528        |
| 4 | $CO_2$  | 44.0095         |

The i subscript denotes the states. States are numbered 102–112, as shown in FIGS. 2, 3a and 3b. Prescribed model parameters are $p_{102}$, $T_{102}$, $T_m$, $p_a$, $P_c$, n, $\eta_c$, $\eta_t$, $\eta_{rg}$ The pressure and temperature of the compressor inlet, state 102, are given. The calculation throughout is normalized by an assumed, convenient oxygen molar flow rate of 1 kmol/s at the inlet to the compressor. Consequently, the inlet mass flow rate, in units of kg/s, is $$\dot{m}_{102} = W_1 \quad (2)$$

which is a huge flow rate for a COIL. An actual large COIL might have a flow rate of 0.1 $W_1$, in which case all computed flow rates, heat transfer rates, and powers are multiplied by 0.1.

The maximum cycle temperature, $T_m$, is both the combustor 54, 58 exit temperature and the turbine 56, 62 inlet temperature. The ambient pressure is $p_a$, while $P_c$ is the prescribed compressor 52 pressure ratio, $p_{104}/p_{102}$. As previously noted, n is the number of combustor/turbine pairs, or stages. The parameters $\eta_c$, $\eta_t$, and $\eta_{rg}$ are the compressor 52, turbine 56, 62, and regenerator efficiencies, respectively. As a matter of convenience, $\eta_c$ equals $\eta_t$, where $\eta_t$ applies to each turbine stage.

The k subscript denotes a particular combustor/turbine pair, and k ranges from unity to n. The one exception is the first combustor when regeneration is present. In this case, the first combustor inlet temperature is $T_x$. The first combustor 54 exit state, which is also a turbine inlet state, is denoted as 106, while the first turbine exit state is 108.

As is standard thermodynamic practice for compressors and turbines, an isentropic calculation is first performed in order to obtain an isentropic exit enthalpy, denoted as $h_{is}$. Thus, $h_{104s}$ and $h_{108s}$ are the isentropic enthalpies at the exit of the compressor and first turbine stage, respectively. The actual enthalpies stem from the component efficiency definitions, written as $$h_{104} = h_{102} + \frac{1}{\eta_c}(h_{104s} - h_{102}) \tag{3}$$

$$h_{104+4k} = h_{102+4k} - \eta_t(h_{102+4k} - h_{104+4k,s}), k=1, 2, \ldots, n \tag{4}$$

where $$T_{102+4k} = T_m, k=1, 2, \ldots, n \tag{5}$$

It is computationally convenient to use temperatures, instead of enthalpies, for the prescribed regenerator efficiency $$\eta_{rg} = \frac{T_x - T_{104}}{T_{104+4n} - T_{104}} \tag{6a}$$

which is used as $$T_x = T_{104} + \eta_{rg}(T_{104+4n} - T_{104}) \tag{6b}$$

Note that if $\eta_{rg}=0$, then $T_x=T_{104}$ and regeneration is, in effect, not used. If $\eta_{rg}=1$, then $T_x=T_{104+4n}$, and $T_x$ has its optimum value. The second law requires $$T_{104} \leq T_y, T_x \leq T_{104+4n} \tag{7}$$

Nevertheless, the computer model can violate these strictures when $P_c$ becomes quite large, say 60. In this circumstance, the compressor outlet temperature, $T_{104}$, can exceed the turbine outlet temperature, $T_{104+4n}$. Of course, regeneration is then not permissible. This result is consistent with the earlier statement that regeneration loses effectiveness when $P_c$ becomes large.

In the model, cycle performance is first computed without regeneration. The regeneration calculation then uses several estimates from the earlier computation; they are denoted with an overbar. In particular, $T_x$ is obtained this way, i.e., $$T_x = T_{104} + \eta_{rg}(\overline{T}_{104+4n} - T_{104}) \tag{8}$$

The actual regenerator efficiency, $\eta'_{rg}$, that corresponds to this $T_x$ value is given by Eq. (6a), where $T_{104+4n}$ is the actual last turbine exit temperature for a cycle with regeneration. The two regeneration efficiencies differ only slightly, since $T_{104+4n}$ hardly changes with regeneration. Because the gas mixture is ideal, but is not a perfect gas mixture with constant specific heat values, a number of temperature values require an iterative numerical solution. These values are readily obtained using any standard root-solving routine. The routine utilized in the model requires a first estimate for the unknown; this is easily provided.

Only oxygen and methane at $T_{102}$ enter the first combustor 54. Sufficient methane is added to raise the exit temperature of the first combustor 54 to $T_m$. For the first combustor 54, a distinction is made between the non-regenerative and regenerative cases. Subsequent combustors do not require this distinction. For the second combustor 58, the entering gas consists of oxygen, water vapor, and $CO_2$ from the preceding combustion, and methane gas, which again enters from the fuel source 55 with an assumed $T_{102}$ temperature. As before, sufficient methane is added to raise the exit temperature to $T_m$. An energy balance equation, for each combustor, is used to determine a compositional variable, $\chi_n$, that is comparable to an equivalence ratio. Aside from this parameter, the heat produced and mass flow rate of methane, per combustor, are evaluated. The heat-produced parameter is only used in the evaluation of a cycle efficiency. A k-loop is also described. The function of the loop is to establish values for parameters, such as $T_{104+4k}$, for each combustor/turbine pair.

Each turbine has an inlet temperature $T_m$ and an outlet state determined by a pressure ratio, $P_t$, given later, that is equivalent to specifying its outlet pressure. The computation is performed inside the k-loop with the final item being the turbine power, $\dot{W}_{tk}$, for the $k^{th}$ stage. The regenerator temperature, $T_x$, is given by Eq. (8). After the k-loop is performed, the actual regenerator efficiency $$\eta'_{rg} = \frac{T_x - T_{104}}{T_{104+4n} - T_{104}} \tag{9}$$

is evaluated. As previously noted, $T_{104+4n}$ is close to $\overline{T}_{104+4n}$ for all n values, even when n=1. Hence, $\eta_{rg}$ and $\eta'_{rg}$ are also close. A regenerator energy balance provides $T_y$. It has the form $$F_5(T_y) = (1-2\chi_n)H_1(T_y) + 2\chi_n H_3(T_y) + \chi_n H_4(T_y) - f_5 = 0 \tag{10a}$$

where $$F_5 = (1-2\chi_n)H_1(T_{104+4n}) + 2\chi_n H_3(T_{104+4n}) + \chi_n H_4 \\ (T_{104+4n}) - H_1(T_x) + H_1(T_{104}) \tag{10b}$$

A first estimate for $T_y$ is given by $$T_y^{(1)} = T_{104} + T_{104+4n} - T_x \tag{10c}$$

In the above, $H_i(T)$ is the ideal gas enthalpy of species i at temperature T. This enthalpy includes the heat of formation. The compositional variable $\chi_k$ is given by:

$$\chi_0 = 0, \chi_k = (1-2\chi_{k-1})\phi_k + \chi_{k-1}, k=1, 2, \ldots, n$$

where the equivalence ratio is $$\phi_k = \frac{\dot{N}_{k_2}}{\dot{N}_{k_1}} = \frac{\chi_k - \chi_{k-1}}{1 - 2\chi_{k-1}}, \quad k = 1, 2, \ldots, n$$

and $\dot{N}_{ki}$ is a molar flow rate for combustor k for species i.

After the k-loop is performed, first with no regenerator and then with a regenerator, the cycle's performance, with and without regeneration, is evaluated by means of:

$$\dot{m}_2 = \sum_{k=1}^{n} \dot{m}_{k2} = W_2 \chi_n \quad (11)$$

$$\left(\frac{\dot{m}_{out}}{\dot{m}_{in}}\right)_1 = 1 - 2\chi_n \quad (12)$$

$$\dot{Q}_{in} = \sum_{k=1}^{n} \dot{Q}_k \quad (13)$$

$$\dot{W}_{net} = \sum_{k=1}^{n} \dot{W}_{tk} - \dot{W}_c \quad (14)$$

$$\eta_{cyc} = \frac{\dot{W}_{net}}{\dot{Q}_{in}} \quad (15)$$

In the above, $\dot{m}_2$ is the total methane flow rate for 1 kmol/s of oxygen. The mass flow ratio given by Eq. (12) is for oxygen, i.e., it represents the fraction of initial oxygen that exits the last turbine. The other three parameters are self-evident.

When the BCP is a pump, set $$\dot{W}_c = \sum_{k=1}^{n} \dot{W}_{tk} \quad (16a)$$

or $$\eta_{cyc} = 0 \quad (16b)$$

and $$P_t = \left(\frac{p_{102}}{p_a} P_c\right)^{\frac{1}{n}}$$

The efficiency condition is only approximately satisfied, i.e., $$0 \leq \eta_{cyc} \leq 0.015 \quad (17)$$

On the other hand, when the BCP is an APU, set $$p_{102} = p_a \quad (18)$$

and the turbine pressure ratio becomes $$P_t = P_c^{1/n} \quad (19)$$

Except when noted, a number of model input parameters are held fixed, i.e., $T_{102}$=300 K, $T_m$=1500 K, $\eta_c$=0.85, $\eta_t$=0.85, $\eta_{rg}$=0.8

A given set of input parameters is used to compute both the non-regenerative and regenerative approaches for n=1, 2, and 3, for a total of six cases. While many hundreds of cases were computed, results are presented for only a select few.

A major reason for the large number of cases is that condition (17) is not readily attained. In the pump mode, many cases had a negative cycle efficiency. Preference is given to n=1, or, if necessary, to n=2 cases. A low n value, of course, represents a relatively compact, low-weight BCP.

Sea-Level Operation

Two nominal pump cases are selected; one without regeneration, the other with. At sea-level, the ambient pressure, $p_a$, is nominally $10^5$ Pa. Aside from parameter values that have already been specified, the input for these nominal cases is given in Table 2. The corresponding performance is provided in Table 3.

TABLE 2

Nominal Cases for a Sea-Level BCP

| Parameter | no regeneration | regeneration |
|---|---|---|
| n | 2 | 2 |
| $p_{102}$ (Pa) | $2 \times 10^4$ | $2 \times 10^4$ |
| $p_{102}$ (Torr) | 150 | 150 |
| Pc | 17 | 18 |

TABLE 3

Output for Table 2 Nominal Cases

| Parameter | no regeneration | regeneration |
|---|---|---|
| $\eta_{cyc}$ | $1.906 \times 10^{-3}$ | $1.268 \times 10^{-2}$ |
| $\dot{m}_2$ (kg/s) | 0.7575 | 0.3914 |
| $\left(\frac{\dot{m}_{out}}{\dot{m}_{in}}\right)_1$ | 0.9056 | 0.9512 |
| $T_x$ (K) | — | 1253 |
| $T_y$ (K) | — | 881.8 |

With $p_{102}$ and $p_a$ equal to $2 \times 10^4$ and $10^5$ Pa, respectively, and no regeneration, a value of n=2 and $P_c$=17 is required for a slightly positive $\eta_{cyc}$. With regeneration, a slightly larger $P_c$ value is required for a positive $\eta_{cyc}$. The advantage of regeneration, however, becomes evident when the values for the methane flow rates are compared. (The value of regeneration is reconsidered shortly.) The regenerator case only requires 51.7% of the fuel required for the non-regenerator BCP. Note that the regenerator cycle efficiency, while still small, is larger than its non-regenerator counterpart. The main reason for this is the sharp reduction of $\dot{Q}_{in}$ for the regenerator cycle. This is a general result that frequently occurs.

In both nominal cases, a reduction in either n or $P_c$ results in a negative efficiency. For example, with n=1, none of the computed cycles, regardless of regeneration or the $P_c$ value, has a positive cycle efficiency. In this circumstance, the required compressor power exceeds the available power from a single turbine unit. (This result, of course, depends on the value of the compressor and turbine efficiencies.)

The methane mass flow rate is quite small compared to the oxygen inlet flow rate. For example, it is only 2.4% of the oxygen mass flow rate when there is no regeneration. The small mass, or molar, methane flow rates are also evident by examining the oxygen $(\dot{m}_{out}/\dot{m}_{in})_1$ ratio. In the non-regenerator case, only 10% of the oxygen is burned, with half this value when a regenerator is used. These fractions are typical of many other cases. This is why the pumping or APU approaches, discussed here, works with a COIL that may buffer the singlet oxygen with a considerable amount of diluent.

Table 4 shows results for a $p_{102}$ scan in which first n, then $P_c$, is minimized with the object of producing a slightly positive cycle efficiency. For the three cases shown, the efficiency first becomes positive for a cycle without regeneration. The $2 \times 10^4$ case is the same as the no-regenerator case in Tables 1 and 2. Note the dramatic change in the BCP as $p_{102}$ increases. The $p_{102}=1.5 \times 10^4$ Pa case has a large compressor pressure ratio, which would require two centrifugal stages and intercooling. The table demonstrates the advantage of a COIL with a high SOG pressure, minimal stagnation pressure loss in the laser nozzle and optical cavity, and an efficient diffuser.

TABLE 4

Inlet Pressure Scan for a Sea-Level BCP

| | $P_{102}$ (Pa) | | |
|---|---|---|---|
| Parameter | $1.5 \times 10^4$ | $2 \times 10^4$ | $2.5 \times 10^4$ |
| regenerator | no | no | no |
| n | 3 | 2 | 1 |
| $P_c$ | 50 | 17 | 11 |
| $\eta_{cyc}$ | $4.512 \times 10^{-3}$ | $1.906 \times 10^{-3}$ | $1.024 \times 10^{-3}$ |
| $\dot{m}_2$ (kg/s) | 0.7468 | 0.7575 | 0.6757 |

There is little variation in the methane mass flow rate because of a trade-off in the amount of fuel required for the first combustor 54 versus the number of combustors. When $P_c$ is large, the temperature difference, $T_m - T_{104}$, is relatively small, but now there are three combustors requiring fuel. On the other hand, when $P_c$ is small, only one combustor is needed, but $T_m - T_{104}$ is large.

A sensitivity evaluation is performed based on the non-regenerative case of Tables 2 and 3. Results are shown in Table 5, where the input has nominal values, except for the parameter to be varied. The cycle efficiency and methane mass flow rate have their expected trends, although the magnitude of the change with $T_m$ is large, as is the magnitude of the change in $\eta_{cyc}$ when $\eta_c = \eta_t$ is varied.

TABLE 5

Sea-Level BCP Sensitivity

| Parameter | $\eta_{cyc}$ | $\dot{m}_2$ (kg/s) |
|---|---|---|
| $T_7 = 280$ K | $2.356 \times 10^{-2}$ | 0.7893 |
| = 320 K | $-2.154 \times 10^{-2}$ | 0.7259 |
| $T_m = 1400$ K | $-2.673 \times 10^{-2}$ | 0.6597 |
| = 1600 K | $2.428 \times 10^{-2}$ | 0.8584 |
| $\eta_c = \eta_t = 0.8$ | $-4.199 \times 10^{-2}$ | 0.7318 |
| = 0.9 | $4.061 \times 10^{-2}$ | 0.7813 |

150 Torr Operation

The ambient pressure is assumed to be $2 \times 10^4$ Pa (150 Torr). A series of cases are shown in Table 6, where the BCP inlet pressure is either $10^4$ Pa (75 Torr) or $1.333 \times 10^4$ Pa (100 Torr). The cases where $\eta_{cyc}$ is small are pure pumping cases; the others are pumping plus APU cases. The regenerator cases all assume $\eta_{rg}=0.8$ and have the same $p_{102}, p_a, P_c$, and $P_t$ values as their non-regenerator counterparts. Note the significant drop in the methane flow rate when a regenerator is used. The use of a regenerator substantially increases the cycle efficiency, but slightly decreases the net power output.

As noted, the reason for this is that the heat input, $\dot{Q}_{in}$, is substantially reduced. A net power of $7 \times 10^3$ kW is quite large, but this is because the inlet oxygen flow rate was arbitrarily set at 1 kmol/s. Because $p_a/p_{102}$ is small, only cycles with a single turbine stage need be considered. From a COIL system viewpoint it is unlikely that a regenerator would be used. As just a pump, the BCP consists of a relatively low-pressure ratio compressor, a combustor, and a single-stage turbine whose pressure ratio is $(p_{102}P_c)/p_a$. The resulting system should be quite compact and lightweight.

TABLE 6

Performance when the Ambient Pressure is 150 Torr and n = 1

| $p_{102}$ (Pa) | $P_c$ | regenerator | $\eta_{cyc}$ | $\dot{W}_{net}$ (kW) | $\dot{m}_2$ (kg/s) |
|---|---|---|---|---|---|
| $10^4$ | 3 | no | $1.356 \times 10^{-2}$ | $5.474 \times 10^2$ | 0.8131 |
| | | yes | $3.514 \times 10^{-2}$ | $3.934 \times 10^2$ | 0.2399 |
| | 10 | no | 0.1638 | $5.524 \times 10^3$ | 0.6875 |
| | | yes | 0.2860 | $5.204 \times 10^3$ | 0.3833 |
| $1.333 \times 10^4$ | 1.8 | no | $2.762 \times 10^{-3}$ | $1.177 \times 10^2$ | 0.8551 |
| | | yes | $4.067 \times 10^{-3}$ | $4.033 \times 10$ | 0.2132 |
| | 10 | no | 0.2276 | $7.675 \times 10^3$ | 0.6875 |
| | | yes | 0.3687 | $7.343 \times 10^3$ | 0.4179 |

Table 7 provides a $P_c$ scan when $p_a=150$ Torr, $p_{102}=75$ Torr, and n=1. The cycle efficiency, with or without regeneration, increases with $P_c$. The efficiency, however, has a maximum value for a larger $P_c$ value than shown in the table. Again, the difference in the efficiency, between non-regenerator and regenerator cases, stems from the reduction in $\dot{Q}_{in}$ when regeneration is used. Note that the difference in $\dot{m}_2$ values, regeneration versus non-regeneration, decreases with $P_c$. As noted earlier, the effectiveness of regeneration decreases with $P_c$.

TABLE 7

Performance when the Ambient Pressure is 150 Torr, the Inlet Pressure is 75 Torr, and n = 1

| $P_c$ | regenerator | $\eta_{cyc}$ | $\dot{W}_{net}$, kW | $\dot{m}_2$, kg/s |
|---|---|---|---|---|
| 2.5 | no | $-1.549 \times 10^{-2}$ | $-6.383 \times 10^2$ | 0.8967 |
| | yes | $-7.331 \times 10^{-2}$ | $-7.292 \times 10^2$ | 0.2138 |
| 3 | no | $1.356 \times 10^{-2}$ | $5.474 \times 10^2$ | 0.8131 |
| | yes | $3.514 \times 10^{-2}$ | $3.934 \times 10^2$ | 0.2399 |
| 4 | no | $5.610 \times 10^{-2}$ | $2.186 \times 10^3$ | 0.7867 |
| | yes | 0.1494 | $1.952 \times 10^3$ | 0.2786 |
| 6 | no | 0.1091 | $4.015 \times 10^3$ | 0.7458 |
| | yes | 0.2397 | $3.712 \times 10^3$ | 0.3284 |
| 8 | no | 0.1417 | $4.974 \times 10^3$ | 0.7139 |
| | yes | 0.2727 | $4.652 \times 10^3$ | 0.3603 |
| 10 | no | 0.1638 | $5.524 \times 10^3$ | 0.6875 |
| | yes | 0.2860 | $5.204 \times 10^3$ | 0.3833 |

Space Operation

For space operation, only the APU mode need be considered. This mode is useful only if the satellite has a substantial need for power during the short intervals that COIL is operational. The APU mode uses Eq. (18) and, in view of the importance of weight, only n=1 is considered.

For a given $P_c$ value, the parameters of interest $$\eta_{cyc}, \dot{W}_{net}, \dot{m}_2$$

are independent of the $p_a$ value, which can be taken as the inlet pressure, $p_{102}$. Table 8 shows a case with $P_c=12$. The only advantage for regeneration is the reduction in the methane flow rate. The efficiency increase is due, again, to a decrease in $\dot{Q}_{in}$. For a large COIL device, with an oxygen flow rate of 0.1 kmol/s, a BCP has the potential for producing approximately 1 MW of power.

TABLE 8

APU Performance for a BCP in Space with $P_c = 12$ and $n = 1$

| regenerator | $\eta_{cyc}$ | $\dot{W}_{net}$ (kW) | $\dot{m}_2$ (kg/s) |
|---|---|---|---|
| no | 0.3256 | $1.059 \times 10^4$ | 0.6647 |
| yes | 0.4492 | $1.029 \times 10^4$ | 0.4776 |

In any of the foregoing modes of operation (sea-level, 150 Torr., and space operation), a regenerator typically reduces the BCP fuel flow rate. In a COIL system, however, the fuel flow rate, with or without regeneration, is negligible compared to the SOG BHP flow rate (it is well below 1% of the BHP mass flow rate in the no-regenerator case). As a consequence, the hardware and benefits associated with regeneration are not warranted.

The use of a BCP according to the present invention makes possible, for the first time, to operate a high-power COIL at sea-level and lower altitudes for extended periods and significantly improves COIL operation at higher altitudes.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

I claim:

1. A gas laser comprising:
   a supply of fluid;
   a nozzle for accelerating supplied fluid to high velocity;
   a laser cavity coupled to the nozzle, wherein the accelerated fluid is employed as a laser gain medium; and
   a Brayton cycle outlet pump having an inlet coupled to the laser cavity, the Brayton cycle outlet pump employing the fluid from the laser cavity as a component of a process fluid in a Brayton cycle to raise the static pressure of the accelerated fluid.

2. The laser according to claim 1, wherein the Brayton cycle outlet pump comprises:
   a compressor having an inlet and an outlet, the inlet coupled to the laser cavity;
   a combustor having an inlet and an outlet, the combustor inlet coupled to the outlet of the compressor; and
   a turbine having an inlet and an outlet, the turbine inlet coupled to the outlet of the combustor, wherein the turbine powers the compressor.

3. The laser according to claim 1, wherein the Brayton cycle outlet pump comprises multiple stages.

4. The laser according to claim 1 further comprising a diffuser between the laser cavity and the Brayton cycle outlet pump.

5. The laser according to claim 1, wherein the Brayton cycle outlet pump includes at least one reheat stage.

6. The laser according to claim 2, wherein the compressor is a multi-stage compressor.

7. The laser according to claim 2, wherein the turbine is a multi-stage turbine.

8. The laser according to claim 1, wherein the Brayton cycle outlet pump includes a regeneration stage.

9. The laser according to claim 1, wherein the Brayton cycle outlet pump includes an intercooling stage.

10. The laser according to claim 2, wherein the turbine has a work output that exceeds the work required to operate the compressor, wherein there is net work output from the Brayton cycle pump.

11. A chemical oxygen-iodine laser (COIL) comprising:
    an oxygen generator;
    a nozzle for accelerating generated oxygen, to supersonic velocity;
    a laser cavity coupled to the nozzle, wherein the accelerated oxygen, with injected iodine, is employed as a laser gain medium; and
    a Brayton cycle outlet pump employing the accelerated oxygen and iodine as a process fluid in a Brayton cycle to raise the static pressure of the accelerated oxygen and iodine to ambient conditions, the Brayton cycle outlet pump including:
       a compressor having an inlet and an outlet, the inlet coupled to the laser cavity to receive and compress the process fluid;
       a combustor having an inlet and an outlet, the combustor inlet coupled to the outlet of the compressor to receive compressed process fluid, add a fuel, and ignite and combust the process fluid and fuel; and
       a turbine having an inlet and an outlet, the turbine inlet coupled to the outlet of the combustor to expand the ignited and combusted gas, wherein the turbine powers the compressor.

12. The laser according to claim 11, wherein the Brayton cycle outlet pump comprises multiple stages.

13. The laser according to claim 11, further comprising a diffuser between the laser cavity and the Brayton cycle outlet pump.

14. The laser according to claim 11, wherein the Brayton cycle outlet pump includes at least one reheat stage.

15. The laser according to claim 11, wherein the compressor is a multi-stage compressor.

16. The laser according to claim 11, wherein the turbine is a multi-stage turbine.

17. The laser according to 11, wherein the Brayton cycle outlet pump includes a regeneration stage.

18. The laser according to claim 11, wherein the turbine has a work output that exceeds the work required to operate the compressor, wherein there is net work output from the Brayton cycle pump.

19. The laser according to claim 11, wherein the Brayton cycle outlet pump includes an intercooling stage.

20. A chemical oxygen-iodine laser (COIL) comprising:
    an oxygen generator;
    a nozzle for accelerating generated oxygen to supersonic velocity;
    a laser cavity coupled to the nozzle, wherein the accelerated oxygen, with injected iodine, is employed as a laser gain medium;
    a diffuser coupled to the laser cavity to decelerate oxygen and iodine to below supersonic velocity;
    a compressor coupled to the diffuser to receive and compress the oxygen and iodine;

a combustor coupled to the compressor to ignite and combust the compressed oxygen and iodine and an added fuel; and a turbine coupled to the combustor to expand the ignited and combusted oxygen and iodine, wherein the turbine powers the compressor.

21. The laser according to claim 20, wherein the compressor is a multi-stage compressor.

22. The laser according to claim 20, wherein the turbine is a multi-stage turbine.

23. The laser according to claim 20, wherein the turbine has a work output that exceeds the work required to operate the compressor.

* * * * *